United States Patent
Masuo

(10) Patent No.: US 10,500,658 B2
(45) Date of Patent: Dec. 10, 2019

(54) GEAR CHAMFERING DEVICE AND GEAR PROCESSING MACHINE EQUIPPED WITH SAID GEAR CHAMFERING DEVICE

(71) Applicant: MITSUBISHI HEAVY INDUSTRIES MACHINE TOOL CO., LTD., Ritto-shi, Shiga (JP)

(72) Inventor: Koichi Masuo, Tokyo (JP)

(73) Assignee: MITSUBISHI HEAVY INDUSTRIES MACHINE TOOL CO., LTD., Shiga (JP)

( * ) Notice: Subject to any disclaimer, the term of this patent is extended or adjusted under 35 U.S.C. 154(b) by 74 days.

(21) Appl. No.: 15/556,470

(22) PCT Filed: Mar. 11, 2016

(86) PCT No.: PCT/JP2016/057769
§ 371 (c)(1),
(2) Date: Sep. 7, 2017

(87) PCT Pub. No.: WO2016/148061
PCT Pub. Date: Sep. 22, 2016

(65) Prior Publication Data
US 2018/0043446 A1    Feb. 15, 2018

(30) Foreign Application Priority Data

Mar. 13, 2015 (JP) ................................. 2015-050131

(51) Int. Cl.
*B23Q 7/02* (2006.01)
*B23F 19/10* (2006.01)
*B23F 23/04* (2006.01)

(52) U.S. Cl.
CPC .............. *B23F 19/10* (2013.01); *B23F 23/04* (2013.01); *B23Q 7/02* (2013.01); *Y10T 409/100954* (2015.01); *Y10T 409/101113* (2015.01)

(58) Field of Classification Search
CPC . Y10T 409/100795; Y10T 409/100954; Y10T 409/101113; Y10T 409/101272;
(Continued)

(56) References Cited

U.S. PATENT DOCUMENTS 1,928,770 A * 10/1933 Uhlmann ................ B23F 19/10
269/61
3,782,041 A    1/1974 Batorski
(Continued)

FOREIGN PATENT DOCUMENTS

DE    4134925 C1    11/1992
DE    4400887 A1    8/1995
(Continued)

OTHER PUBLICATIONS

IDS reference JP 2006-224228 Machine Translation (Year: 2006).*
(Continued)

*Primary Examiner* — Nicole N Ramos
(74) *Attorney, Agent, or Firm* — Birch, Stewart, Kolasch & Birch, LLP

(57) ABSTRACT

The present invention is provided with: gear chamfering tools that perform cutting for chamfering a tooth profile ridge section of a gear to be cut; tool holding parts for holding the gear chamfering tools at one end portion thereof; substantially linear movement means which cause substantially linear movement of the other end portion opposed to the one end portion for holding the gear chamfering tools in the tool holding parts; and circular movement means for causing circular movement of an intermediate portion
(Continued)

between the one end portion for holding the gear chamfering tools and the other end portion subjected to the substantially linear movement by the substantially linear movement means in the tool holding parts. By combining the substantially linear movement means and the circular movement means, substantially elliptical movement of tip end parts of the gear chamfering tools is achieved.

11 Claims, 5 Drawing Sheets

(58) Field of Classification Search
CPC ........ Y10T 483/16; B23Q 7/10; B23Q 7/046; B23F 23/04; B23F 23/02; B23F 19/102
See application file for complete search history.

(56) References Cited

U.S. PATENT DOCUMENTS

| | | | |
|---|---|---|---|
| 4,012,990 A | | 3/1977 | Wagner |
| 4,726,720 A | | 2/1988 | Lieser |
| 5,154,553 A | * | 10/1992 | Baumstark ............. B21H 5/022 407/31 |
| 2007/0186398 A1 | | 8/2007 | Lee et al. |
| 2012/0209418 A1 | * | 8/2012 | Winkel ............... B23F 23/1218 700/159 |
| 2013/0225379 A1 | * | 8/2013 | Kato ....................... B23Q 3/157 483/1 |

FOREIGN PATENT DOCUMENTS

| | | |
|---|---|---|
| DE | 19518483 A1 | 11/1996 |
| JP | 51-69194 U | 11/1974 |
| JP | 59-93210 A | 5/1984 |
| JP | 60-26889 U | 2/1985 |
| JP | 60-26889 Y2 | 8/1985 |
| JP | 6-320333 A | 11/1994 |
| JP | 2006-224228 A | 8/2006 |

OTHER PUBLICATIONS

International Search Report and Written Opinion of the International Searching Authority (Forms PCT/ISA/210, PCT/ISA/220, PCT/ISA/237, PCT/IB/338 and PCT/IB/373) for International Application No. PCT/JP2016/057769, dated May 31, 2016, with English translations.

* cited by examiner

GEAR CHAMFERING DEVICE AND GEAR PROCESSING MACHINE EQUIPPED WITH SAID GEAR CHAMFERING DEVICE

TECHNICAL FIELD

The present invention relates to a gear chamfering device which performs gear chamfering on a gear and a gear processing machine equipped with the gear chamfering device.

BACKGROUND ART

In processing of a gear, gear chamfering is performed on a workpiece (gear to be cut) subjected to gear cutting in a bobbing machine or the like in some cases. The gear chamfering is processing of chamfering a tooth profile ridge section which is a corner portion formed by an end surface and tooth surfaces of the workpiece.

There is a method of gear chamfering in which chamfering (rolling) is performed by pressing a phrasing cutter being a gear chamfering tool against the tooth profile ridge section of the workpiece to crush the tooth profile ridge section. When the tooth profile ridge section is chamfered by rolling as described above, raised portions are formed in the tooth surfaces by the crushing of the tooth profile ridge section, and this may affect tooth surface accuracy of the workpiece.

Then, there is a method of gear chamfering in which chamfering (cutting) is performed by, instead of rolling with the phrasing cutter, making a cutting tool being the gear chamfering tool cut into the tooth profile ridge section of the workpiece to cut the tooth profile ridge section (for example, Patent Document 1). Operations of the cutting tool in such gear chamfering by cutting are illustrated in an explanatory diagram of FIG. 5. In the gear chamfering by cutting, as illustrated in FIG. 5, a not-illustrated crank mechanism causes a cutting tool 144 (cutting edge portion 156 of the cutting tool 144) to perform a reciprocation drawing an arc-shaped (substantially linear) trajectory $T_{156}$, and the cutting edge portion 156 of the cutting tool 144 is made to cut into a tooth profile ridge section $W_R$ of a workpiece W.

In this reciprocation of the cutting tool 144, the cutting edge portion 156 of the cutting tool 144 moves from an initial position $L_{100}$ distant from the workpiece W toward the workpiece W (leftward in FIG. 5) while drawing the arc-shaped trajectory $T_{156}$, cuts (chamfers) the tooth profile ridge section $W_R$ after passing an entrance position $L_{101}$ where the cutting edge portion 156 enters a portion between tooth surfaces $W_s$ of the workpiece W, reaches a turn-around position $L_{102}$ after the cutting (chamfering), and then returns to the initial position $L_{100}$ while drawing the same arc-shaped trajectory $T_{156}$.

When the cutting edge portion 156 of the cutting tool 144 is located in an operation area $A_{101}$ between the initial position $L_{100}$ and the entrance position $L_{101}$, no cutting tool 144 is located in the portion between the tooth surfaces $W_s$ of the workpiece W. Accordingly, there is no risk of interference between the workpiece W and the cutting tool 144 even if the workpiece W is rotationally driven. However, when the cutting edge portion 156 of the cutting tool 144 is located in an operation area $A_{102}$ between the entrance position $L_{101}$ and the turn-around position $L_{102}$, at least part of the cutting tool 144 is located in the portion between the tooth surfaces $W_s$ of the workpiece W. Accordingly, the workpiece W and the cutting tool 144 interfere with each other if the workpiece W is rotationally driven. Thus, although the workplace W can be rotationally driven when the cutting edge portion 156 of the cutting tool 144 is located in the operation area $A_{101}$, the workpiece W cannot be rotationally driven when the cutting edge portion 156 of the cutting tool 144 is located in the operation area $A_{102}$, and the rotation of the workplace W has to be stopped.

In other words, in the gear chamfering by the cutting using the cutting tool 144, the chamfering is performed on the tooth profile ridge section $H_R$ of the workpiece W by causing the cutting tool 144 to perform the reciprocation such that the cutting edge portion 156 of the cutting tool 144 draws the arc-shaped trajectory $T_{156}$, and by intermittently rotationally driving the workpiece W when the cutting edge portion 156 of the cutting tool 144 is located in the operation area $A_{101}$.

PRIOR ART DOCUMENT

Patent Document

Patent Document 1: Japanese Examined Utility Model Registration Application Publication No. Sho 60-26889

SUMMARY OF THE INVENTION

Problems to be Solved by the Invention

However, since the workpiece W needs to be rotated by a predetermined angle (angle corresponding to one pitch) while the cutting edge portion 156 of the cutting tool 144 is located in the operation area $A_{101}$, the large operation area $A_{101}$ needs to be set for the rotation of the workpiece W by the predetermined angle (angle corresponding to one pitch). Setting the larger operation area $A_{101}$ means an increase of non-processing time, and processing efficiency as a gear chamfering device decreases.

The present invention has been made in view of the problems described above and an object thereof is to improve processing efficiency in a gear chamfering device which performs gear chamfering of a gear to be cut by cutting.

Means for Solving the Problems

A gear chamfering device in a first aspect of the present invention for solving the problems described above comprises: a gear chamfering tool which chamfers a tooth profile ridge section of a gear to be cut by cutting; a tool holding part which holds the gear chamfering tool in one end portion thereof; substantially linear movement means for causing another end portion of the tool holding part to make a substantially linear movement, the other end portion being opposite to the one end portion which holds the gear chamfering tool; and circular movement means for causing an intermediate portion of the tool holding part to make a circular movement, the intermediate portion provided between the one end portion which holds the gear chamfering tool and the other end portion which is caused to make the substantially linear movement by the substantially linear movement means, wherein a tip end part of the gear chamfering tool is caused to make a substantially elliptical movement by combining the substantially linear movement means and the circular movement means.

A gear chamfering device in a second aspect of the present invention for solving the problems described above is the gear chamfering device in the first aspect in which a pair of the gear chamfering tools, a pair of the tool holding parts, a pair of the circular movements means, and a pair of the substantially linear movement means are provided to face the gear to be cut.

A gear chamfering device in a third aspect of the present invention for solving the problems described above is the gear chamfering device in the first or second aspect in which the circular movement means includes a drive part, a gear part which is coupled to the drive part, a first shaft portion which is coupled to the gear part and Which is rotated by drive of the drive part, and a second shaft portion which is continuous to the first shaft portion and which is caused to make a circular movement by rotation of the first shaft portion, the substantially linear movement means includes a rotating member having one end, rotatably supported on a structure part, and the tool holding part is coupled at the intermediate portion to the second shaft portion and is coupled at the other end portion to another end portion of the rotating member.

A gear chamfering device in a fourth aspect of the present invention for solving the problems described above is the gear chamfering device in one of the first to third aspects in which in the tool holding part, a holding position of the gear chamfering tool is adjustable in a pitch direction of the gear to be cut.

A gear processing machine in a fifth aspect of the present invention for solving the problems described above comprises: a gear processing tool for performing predetermined gear processing on a gear to be cut; moving means for moving the gear processing tool in three different axial directions; a conveying device which conveys the gear to be cut between a loading-unloading position where the gear to be cut is loaded or unloaded and a gear processing position where the gear processing tool performs the gear processing on the gear o be cut; and the gear chamfering device according to any one of the first to fourth aspects, wherein the conveying device conveys the gear to be cut to a gear chamfering position where the gear chamfering device performs the gear chamfering on the gear to be cut between the loading-unloading position and the gear processing position.

Effect of the Invention

In the gear chamfering device in the first aspect of the present invention, the gear chamfering tool held in the one end portion of the tool holding part can be caused to make the substantially elliptical movement by combining the substantially linear movement means and the circular movement means, that is by causing the other end portion of the tool holding part to make the substantially linear movement by the substantially linear movement means and causing the intermediate portion of the tool holding part to make the circular movement by the circular movement means. Causing the gear chamfering tool to make the elliptical movement as described above allows the gear chamfering tool to move outside a portion between tooth surfaces of the gear to be cut when the gear chamfering tool finishes the cutting and then returns to a position before the cutting. Accordingly, the gear to be cut can be rotated by a predetermined angle (angle corresponding to one pitch) during this movement. Hence, no large operation area of the gear chamfering tool needs to be wastefully set for the rotation of the gear to be cut by the predetermined angle, and it is possible to prevent an increase of non-processing time and improve processing efficiency as a gear chamfering device.

In the gear chamfering device in the second aspect of the present invention, the tooth profile ridge portions on both end surfaces of the gear to be cut can be chamfered (cut).

In the gear chamfering device in the third aspect of the present invention, the circular movement means and the substantially linear movement means can have simple configurations. Specifically, since the gear chamfering device has a structure which is not complex, the size increase can be suppressed and, for example, the gear chamfering device can be made small enough to be attached to a hobbing machine.

In the gear chamfering device in the fourth aspect of the present invention, adjusting the holding position of the gear chamfering tool in the pitch direction of the gear to be cut enables gear chamfering for gears such as spur gears and various helical gears.

In the gear processing machine in the fifth aspect of the present invention, the gear processing and the gear chamfering can be performed on the gear to be cut in one gear processing machine.

MODE FOR CARRYING OUT THE INVENTION

An embodiment of a machine tool in the present invention is describe Below in detail with reference to the attached drawings. As a matter of course, the present invention is not limited to the following embodiment and various changes can be made within the scope not departing from the gist of the present invention.

Embodiment 1

A structure of a gear processing machine including a gear chamfering device in Embodiment 1 of the present invention is described with reference to FIGS. 1 to 4.

Figure 1:
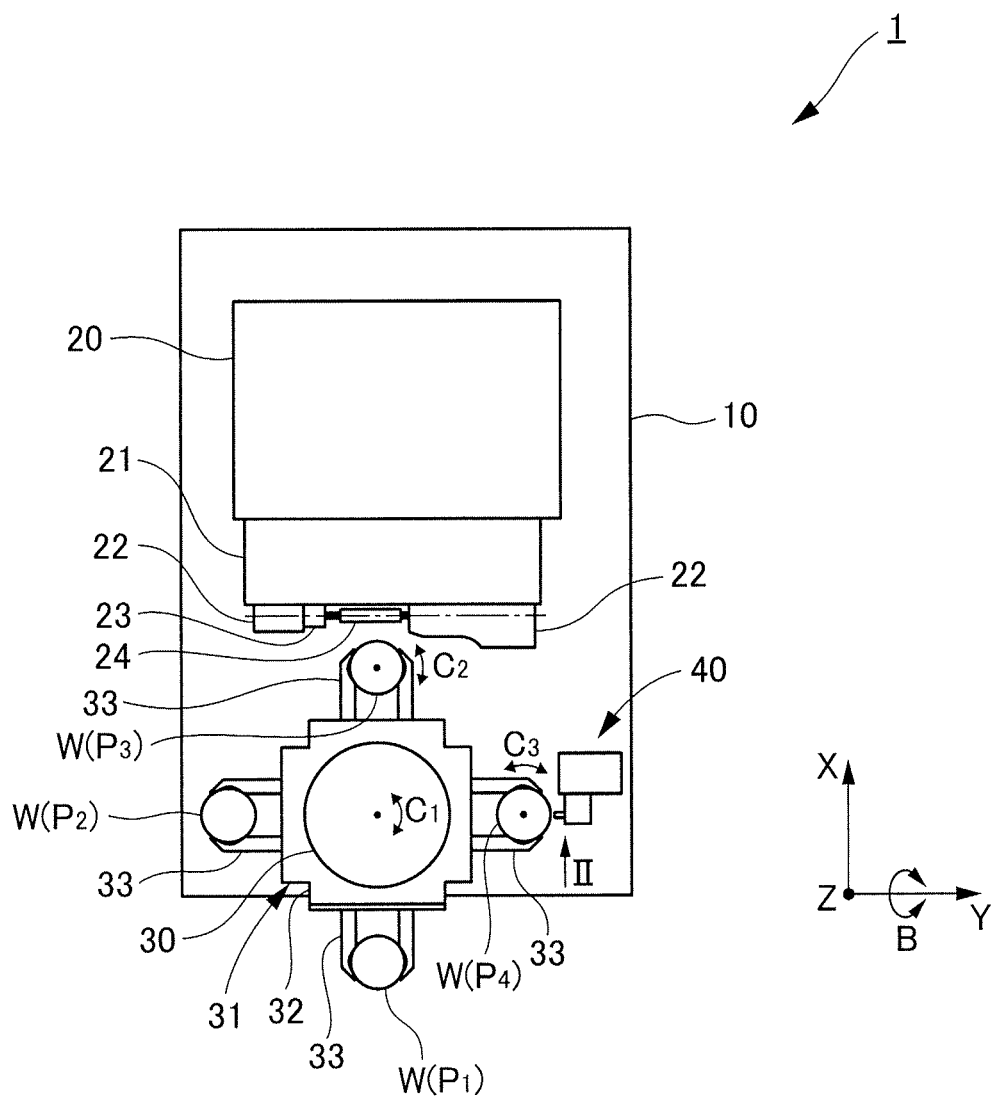
FIG. 1 is a plan view illustrating a gear processing machine including a gear chamfering device in Embodiment 1.

As illustrated in FIG. 1, a hobbing machine 1 which is the gear processing machine is provided with a bed 10 and a column 20 supported on the bed 10 to be movable in a horizontal X-axis direction (up-down direction in FIG. 1). A saddle 21 is supported on the column 20 to be capable of being lifted and lowered in a vertical Z axis direction (direction orthogonal to the sheet surface of FIG 1), and a hob head 22 is supported on the saddle 21 to be movable in a horizontal Y-axis direction (left-right direction in FIG. 1) orthogonal to the X-axis direction and the Z-axis direction. Moreover, a hob support 23 is supported on the hob head 22 to be movable in the direction parallel to the Y axis and a hob cutter 24 which is a gear processing tool is attached to the hob head 22 and the hob support 23 such that the hob head 22 and the hob support 23 allow the hob cutter 24 to be detached and rotated about a horizontal B-axis.

In this hobbing machine 1, the hob cutter 24 can be moved in three different axial directions of the X-axis, the Y-axis, and the Z-axis by driving the column 20, the saddle 21, and the hob head 22 with not-illustrated driving means. Moreover, the hob cutter 24 attached to the hob head 22 and the hob support 23 can be rotated about the B-axis by not-illustrated rotating means.

Furthermore, a counter column 30 stands upright on the bed 10 to face the column 20, and a workpiece conveying device 31 which holds and conveys workpieces (gears to be cut) W is provided on the counter column 30. The workpiece conveying device 31 includes a main body part 32 which is supported on the counter column 30 and which is turnable about a vertical $C_1$ axis and four grippers 33 which are supported on the main body part 32 and which grip the workpieces W.

The four grippers 33 are provided at even angular in this embodiment) intervals to extend outward from the main body part 32 (counter column 30) in four directions. The workpieces W gripped by the grippers 33 are located respectively at a loading-unloading position $P_1$, a processing preparation position $P_2$ a gear processing position $P_3$, and a gear chamfering position $P_4$ in the hobbing machine 1. Then, each of the workpieces W gripped by the grippers 33 sequentially moves to one of the predetermined positions described above (the loading-unloading position $P_1$, the processing preparation position $P_2$, the gear processing position $P_3$, and the gear chamfering position $P_4$) every time the main body part 32 is rotated (in FIG. 1, rotated clockwise) by 90° and is disposed at this position.

Here, the loading-unloading position $P_1$ is a position where a not workpiece loading-unloading device loads the workpiece W onto the hobbing machine 11 and unloads the workpiece W from the hobbing machine 1, and the processing preparation position $P_2$ is a position where the workpiece W loaded on the hobbing machine 1 is disposed before processing.

Moreover, the gear processing position $P_3$ is a position for performing gear processing on the workpiece W and is a position facing the hob cutter 24 described above. A not-illustrated rotating table on which the workpiece W is mounted and which is rotatable about a vertical $C_2$ axis is provided at the gear processing position $P_3$. The predetermined gear processing can be performed on the workpiece W by rotating the workpiece W located at the gear processing position $P_3$ and mounted on the not-illustrated rotating table about the $C_2$ axis, by rotating the hob cutter 24 attached to the hob head 22 and the hob support 23, and by driving the column 20, the saddle 21, and the hob head 22 to move the hob cutter 24 in the three different axial directions.

The gear chamfering position $P_4$ is a position for performing gear chamfering on the workpiece W subjected to the gear processing. A not-illustrated rotating table on which the workpiece W is mounted and which is rotatable about a vertical $C_3$ axis is provided at the gear chamfering position $P_4$ and a gear chamfering processing device 40 is provided on the bed 10 near the gear chamfering position $P_4$ to face the not-illustrated rotating table.

The workpiece W rotated about the $C_3$ axis by the not-illustrated rotating table at the gear chamfering position $P_4$ is processed such that a tooth profile ridge section $W_R$ which is a corner portion formed by an end surface $W_E$ and tooth surfaces $W_S$ is chamfered by the gear chamfering processing device 40 to be described later (see FIG. 4).

Figure 2:
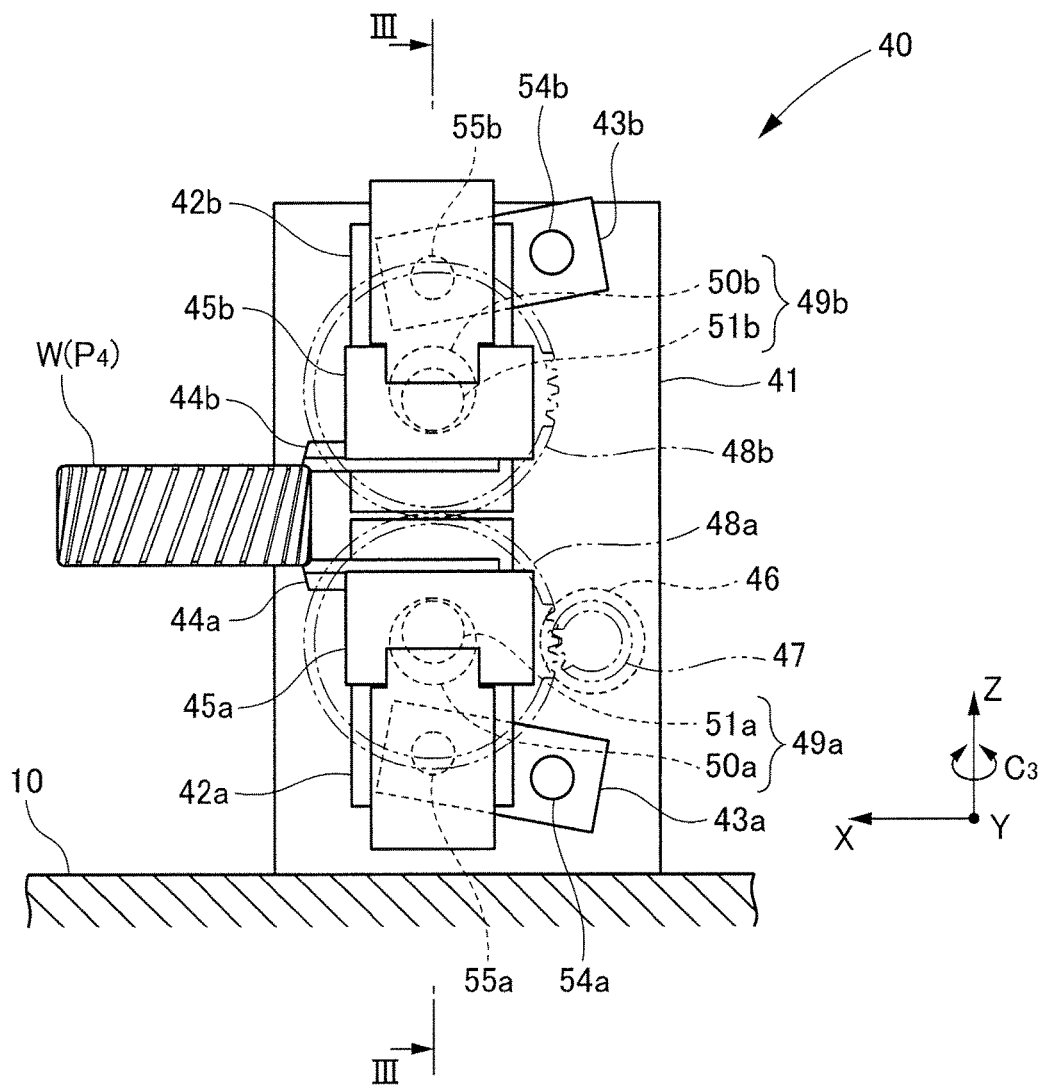
FIG. 2 is a side view (view in a direction of the arrow II in FIG. 1) illustrating the gear chamfering device in Embodiment 1.
Figure 3:
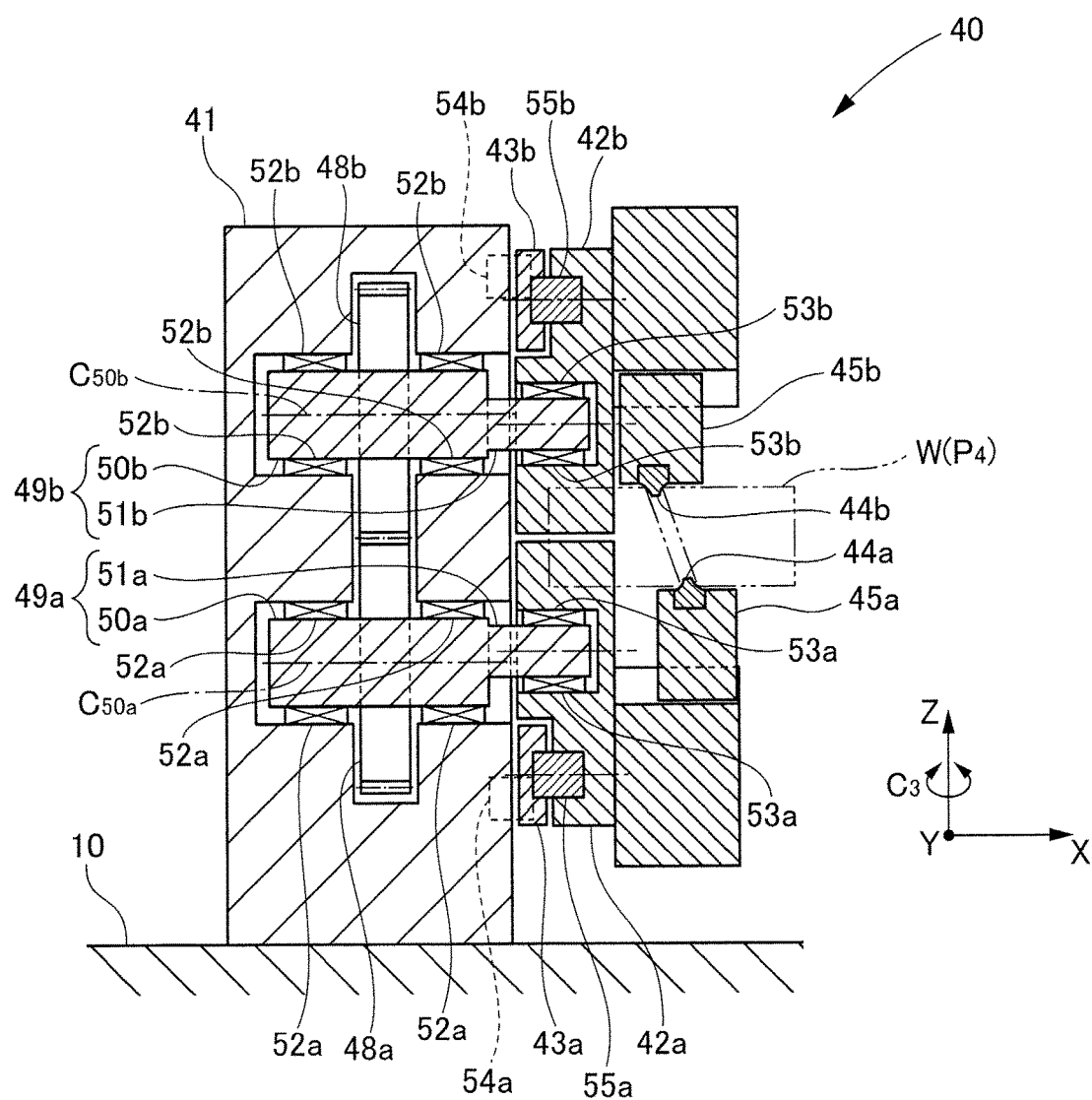
FIG. 3 is a cross-sectional view (cross-sectional view taken along the line and viewed in the direction of the arrows in FIG. 2) illustrating the gear chamfering device in Embodiment 1.

As illustrated in FIGS. 2 and 3, the gear chamfering processing device 40 includes a main body part 41 which stands upright on the bed 10, swinging parts 42a, 42b which are swing ably supported on the main body part 41, restricting parts 43a, 43b which are rotatably supported. on the main body part 41 and which are coupled to one end portions of the swinging parts 42a, 42b to restrict operations of the swinging parts 42a, 42b, and cutting tool holding parts 45a, 45b which are fixed to the swinging parts 42a, 42b and which hold cutting tools 44a, 44b for the gear chamfering.

In the main body part 41, there are incorporated a motor 46 which is a drive source, a first drive gear 47 which is coupled to the motor 46, a lower second drive gear 48a which meshes with the first drive gear 47 to swing the lower swinging part 42a, and an upper second drive gear 48b which meshes with the lower second drive gear 48a to swing the upper swinging part 42b.

The second drive gears 48a, 48b are provided respectively with eccentric shafts 49a, 49b. The eccentric shafts 49a, 49b are formed by forming the first shaft portions 50a, 50b and the second shaft portions 51a, 51b which have different shaft centers in a continuous manner. The first shaft portions 50a, 50b on one end side (left side in FIG. 3) are fixed concentric to the rotation centers of the second drive gears 48a, 48b, respectively, and are rotatably supported on the main body part 41 via bearings 52a, 52b while the second shaft portions 51a, 51b on the other end side (right side in FIG. 3) are coupled respectively to center portions of the swinging parts 42a, 42b via bearings 53a, 53b.

Specifically, the paired lower and upper second drive gears 48a, 48b coupled to the motor 46 via the first drive gear 47 are coupled to the paired lower and upper swinging parts 42a, 42b via the eccentric shafts 49a, 49b including the first shaft portions 50a, 50b and the second shaft portions 51a, 51b which have the different shaft centers.

Accordingly, when the motor 46 is driven, the second drive gears 48a, 48b are rotationally driven via the first drive gear 47 and the rotational drive of the second drive gears 48a, 48b causes the eccentric shafts 49a, 49b to rotate about the shaft centers $C_{50a}$, $C_{50b}$ of the first shaft portions 50a, 50b. In the rotation of the eccentric shafts 49a, 49b, the second shaft portions 51a, 51b make circular movements about the shaft centers $C_{50a}$, $C_{50b}$ of the first shaft portions 50a, 50b. The circular movements of the second shaft portions 51a, 51b cause the swinging parts 42a, 42b to perform predetermined operations.

The cutting tool holding parts 45a, 45b are fixed respectively to the swinging parts 42a, 42b and the cutting tools 44a, 44b which are gear chamfering tools for chamfering the tooth profile ridge sections $W_R$ of the workpiece W by cutting are detachably attached to the cutting tool holding parts 45a, 45b, respectively. Note that, since the cutting tool holding parts 45a, 45b and the cutting tools 44a, 44b are fixed to and supported on the swinging parts 42a, 42b, the cutting tool holding parts 45a, 45b and the cutting tools 44a, 44b operate in a way similar to the swinging parts 42a, 42b.

The cutting tools 44a, 44b are located in the other end portions of the swinging parts 42a, 42b, specifically located closer to the workpiece W than coupling portions of the swinging parts 42a, 42b with the eccentric shafts 49a, 49b (second shaft portions 51a, 51b) are in an axial direction (up-down direction in FIGS. 2 and 3) of the workpiece W (located in a lower portion of the upper swinging part 42b and an upper portion of the lower swinging part 42a in FIGS. 2 and 3).

Moreover, the main body part 41 is provided with the restricting parts 43a, 43b which restrict operations of the one end portions of the swinging parts 42a, 42b. One end portions of the restricting parts 43a, 43b are rotatably supported on the main body part 41 via first pin members 54a, 54b and the other end portions thereof are rotatably coupled to the swinging parts 42a, 42b via second pin members 55a, 55b.

Since the restricting parts 43a, 43b rotate about the first pin members 54a, 54b supported on the main body part 41, the other end portions (portions near the second pin members 55a, 55b) of the restricting parts 43a, 43b and the one end portions of the swinging parts 42a, 42b coupled to these other end portions perform reciprocation (upward and downward movements in FIG. 2) drawing arc-shaped (substantially linear) trajectories about the first pin members 54a, 54b.

The restricting parts 43a, 43b are located in the one end portions of the swinging parts 42a, 42b, specifically located on the opposite sides, of the coupling portions with the eccentric shafts 49a, 49b (second shaft portions 51a, 51b), to the workpiece W in the axial direction of the workpiece W (in an upper portion of the upper swinging part 42b and a lower portion of the lower swinging part 42a in FIGS. 2 and 3).

Figure 4:
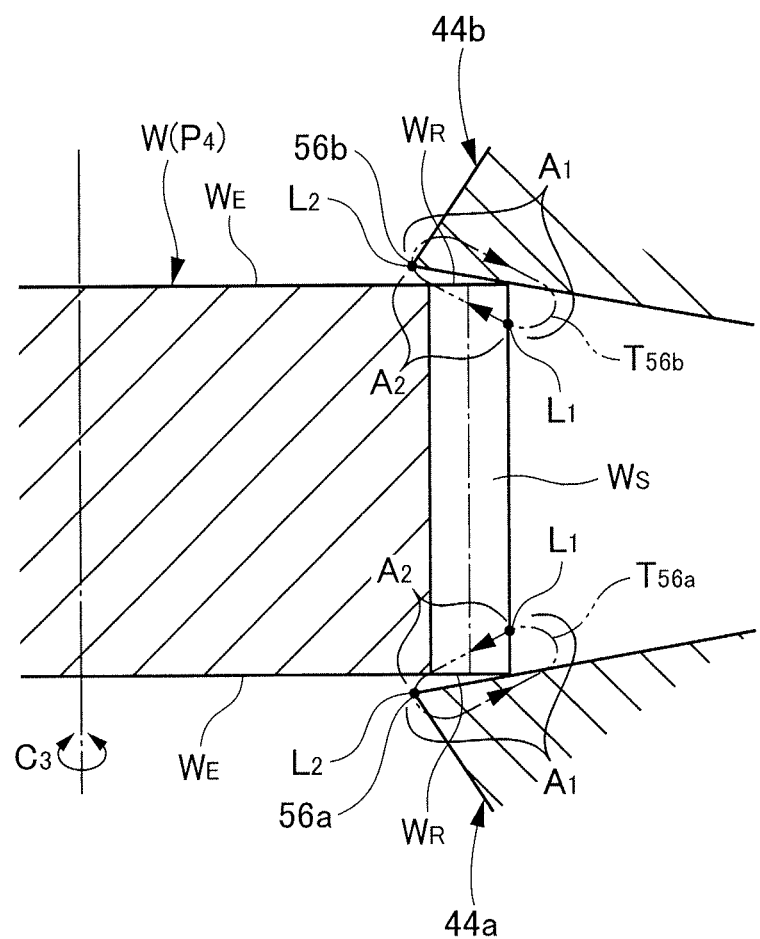
FIG. 4 is an explanatory diagram illustrating operations of a cutting tool in the gear chamfering device in Embodiment 1.
Figure 5:
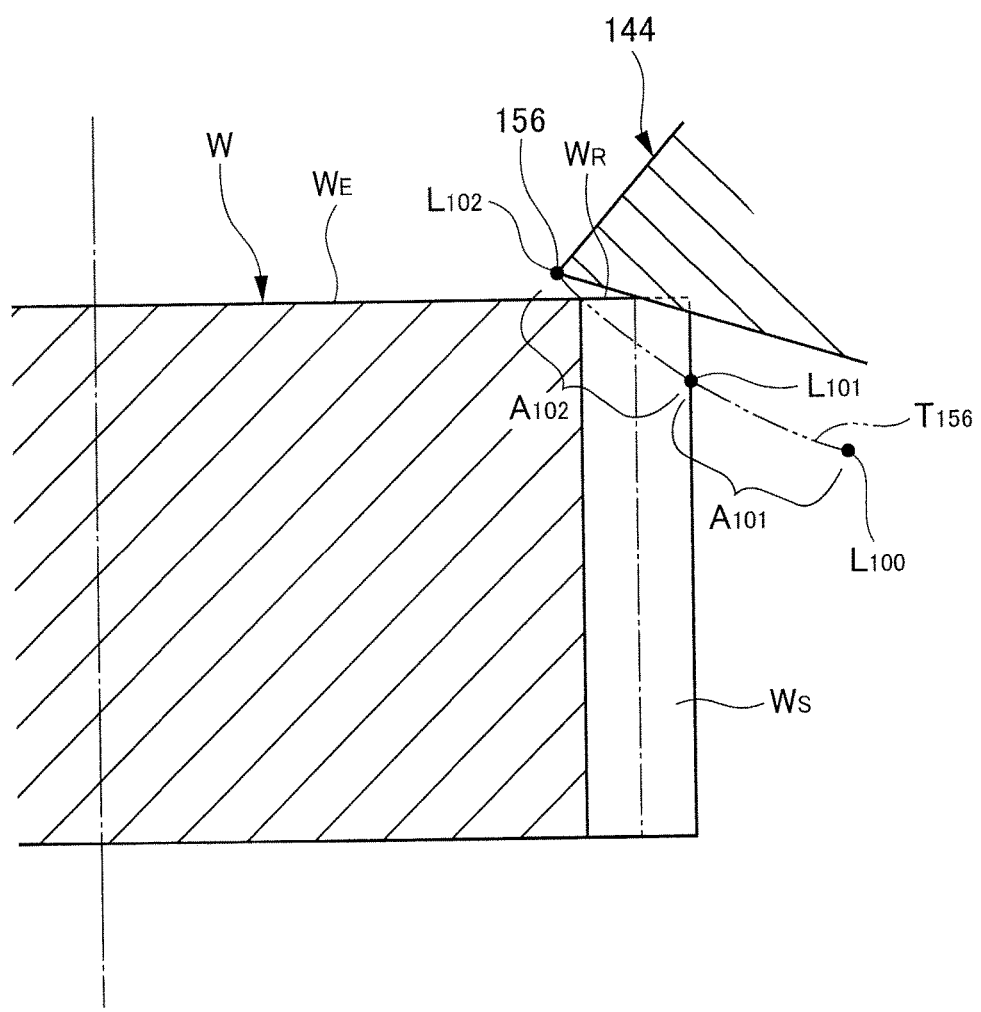
FIG. 5 is an explanatory diagram illustrating operations of a cutting tool in a conventional gear chamfering device.

Specifically, the center portions of the swinging parts 42a, 42b operate in a way similar to the circular movements of the second shaft portions 51a, 51b about the shaft centers $C_{50a}$, $C_{50b}$, of the first shaft portions 50a, 50b in the eccentric shafts 49a, 49b while the one end portions of the swinging parts 42a, 42b (portions coupled to the restricting parts 43a, 43b) perform the reciprocation (substantially linear operations and upward and. downward movements in FIG. 2) restricted by the restricting parts 43a, 43b, and the cutting tools 44a, 44b, fixed to the swinging parts 42a, 42b via the cutting tool holding parts 45a, 45b and located in the other end portions of the swinging parts 42a, 42b, and cutting edge portions 56a, 56b of the cutting tools 44a, 44b operate so as to draw substantially elliptical trajectories $T_{56a}$, $T_{56b}$ (see two-dot chain lines in FIG. 4).

Accordingly, as illustrated in FIG. 4, during the rotation drawing the substantially elliptical trajectories $T_{56a}$, $T_{56b}$, the cutting edge portions 56a, 56b of the cutting tools 44a, 44b pass entrance positions $L_1$ where at least part (cutting edge portions 56a, 56b) of the cutting tools 44a, 44b enter a portion between the tooth surfaces $W_s$ of the workpieces W, then cut (chamfer) the tooth profile ridge sections $W_R$ of the workpiece W, reach exit positions $L_2$ where the cutting tools 44a, 44b exit the portion between the tooth surfaces $W_s$ of the workpiece W after the cutting (chamfering), and return while moving outside the portion between tooth surfaces $W_s$ so as to draw the substantially elliptical trajectories $T_{56a}$, $T_{56b}$.

In this case, when the cutting edge positions 56a, 56b of the cutting tools 44a, 44b are located in operation areas $A_2$ from the entrance positions $L_1$ to the exit positions, at least part of the cutting tools 44a, 44b are located in the portion between tooth surfaces of the workpiece W. Accordingly, the rotation of the workpiece W by the not-illustrated rotating table is stopped.

Meanwhile, when the cutting edge portions 56a, 56b of the cutting tools 44a, 44b are located in operation areas $A_1$ from the exit positions $L_2$ to the entrance positions $L_1$, no cutting tools 44a, 44b are located in the portion between tooth surfaces $W_s$ of the workpiece. Accordingly, the workpiece W is rotationally driven by the not-illustrated rotating table.

The workpiece can be thus subjected to the gear chamfering by intermittently rotating the workpiece W located at the gear chamfering position $P_4$ and mounted on the not-illustrated rotating table about the axis $C_3$ and by driving the motor 46 in the gear chamfering processing device 40 and causing the cutting edge portions 56a, 56b of the cutting tools 44a, 44b to operate so as to draw the substantially elliptical trajectories $T_{56a}$, $T_{56b}$ as described above.

In the cutting tool holding parts 45a, 45b, holding positions of the cutting tools 44a, 44b in a pitch direction of the workpiece W can be individually adjusted to match the type, dimension, and the like of the workpiece W. As illustrated in FIG. 3, in the hobbing machine 1, the upper cutting tool 44b and the lower cutting tool 44a are disposed to be offset from each other in the pitch direction of the workpiece W (left-right direction in FIG. 3) so as to correspond to the workpiece W which is a helical gear.

Operations of the gear processing machine including the gear chamfering device in Embodiment 1 of the present invention are described with reference to FIGS. 1 to 4.

First, the workpiece W is passed from the not-illustrated workpiece loading-unloading device to one of the grippers 33 in the workpiece conveying device 31 to be set at the loading-unloading position $P_1$. The workpiece conveying device 31 performs the turn operation to rotate the main body part 32 and the grippers 33 by 90° and the workpiece W located at the loading-unloading position $P_1$ is thereby set at the processing preparation position $P_2$ (see FIG. 1) . At this time, a new workpiece W is loaded onto the hobbing machine 1 by the not-illustrated workpiece loading-unloading device. The workpieces W are thus sequentially loaded onto the hobbing machine 1 one by one.

The workpiece conveying device 31 performs the turn operation to rotate the main body part 32 and the grippers 33 by 90° and the workpiece W located at the processing preparation position $P_2$ is thereby set at the gear processing position $P_3$.

At the gear processing position $P_3$, the workpiece W is disposed on the not-illustrated rotating table rotatable about the $C_2$ axis and subjected to the predetermined gear processing. Specifically, the predetermined gear processing is performed on the workpiece W by rotating the not-illustrated rotating table about the $C_2$ axis, by rotating the hob cutter 24 supported. on the hob head 22 and the hob support 23 about the B axis with the not-illustrated rotating means, and by driving the column 20, the saddle 21, and the hob head 22 with the not-illustrated driving means to move the hob cutter 24 in the three different axial directions.

When the gear processing on the workpiece W is completed, the column 20, the saddle 21, and the hob head 22 are driven by the not-illustrated driving means to move the hob cutter 24 in the three different axial directions, away from the workpiece W. Then, the workpiece conveying device 31 performs the turn operation to rotate the main body part 32 and the grippers 33 by 90° and the workpiece W subjected to the predetermined gear processing at the gear processing position $P_3$ is thereby set at the gear chamfering position $P_4$.

At the gear chamfering position $P_4$, the workpiece W is disposed on the not-illustrated rotating table rotatable about the $C_3$ axis and is subjected to the gear chamfering by the gear chamfering processing device 40.

Driving the drive motor 46 rotationally drives the second gears 48a, 48b via the first drive gear 47 in synchronization (see FIGS. 2 and 3). In this case, the eccentric shafts 49a, 49b fixed to the second drive gears 48a, 48b rotate about the rotation centers of the second drive gears 48a, 48b, that is about the shalt centers $C_{50a}$, $C_{50b}$ of the first shaft portions 50a, 50b. Specifically, in the eccentric shafts 49a, 49b, the first shaft portions 50a, 50b are rotationally driven about the shaft centers $C_{50a}$, $C_{50b}$ of the first shaft portions 50a, 50b while the second shaft portions 51a, 51b make circular movements about the shaft centers $C_{50a}$, $C_{50b}$ of the first shaft portions 50a, 50b.

The circular movements of the second shaft portions 51a, 51b in the eccentric shafts 49a, 49b cause the swinging parts 42a, 42b coupled to the second shaft portions 51a, 51b to operate. In this case, the operations of the one end portions of the swinging parts 42a, 42b (the upper end portion of the upper swinging part 42b and the lower portion of the lower swinging part 42a) are restricted by the restricting parts 43a, 43b rotatably supported on the main body part 41.

Specifically, portions of the swinging parts 42a, 42b close to the coupling portions (intermediate portions) with the eccentric shafts 49a, 49b make circular movements like the second shaft portions 51a, 51b in the eccentric shafts 49a, 49b while the coupling portion (one end portion) of the swinging parts 42a, 42b with the restricting parts 43a, 43b make substantially linear reciprocating movements like the other end portions of the restricting parts 43a, 43b.

Accordingly, the cutting edge portions 56a, 56b of the cutting tools 44a, 44b fixed to the swinging parts 42a, 42b via the cutting tool holding parts 45a, 45b and located in the other end portions of the swinging parts 42a, 42b, that is on the opposite sides, of the coupling portions (intermediate portions) with the eccentric shafts 49a, 49b, to the coupling portions (one end portions) with the restricting parts 43a, 43b operate so as to draw the substantially elliptical trajectories $T_{56a}$, $T_{56}$ (see FIG. 4).

Specifically, as illustrated in FIG. 4, during the rotation drawing the substantially elliptical trajectories $T_{56a}$, $T_{56b}$, the cutting edge portions 56a, 56b of the cutting tools 44a, 44b pass the entrance positions $L_1$ where at least part (cutting edge portions 56a, 56b) of the cutting tools 44a, 44b enter the portion between the tooth surfaces $W_s$ of the workpieces W, then cut (chamfer) the tooth profile ridge sections $W_R$ of the workpiece W, reach exit positions $L_2$ where the cutting tools 44a, 44b exit the portion between the tooth surfaces $W_s$ of the workpiece W after the cutting (chamfering), and return while moving outside the portion between tooth surfaces $W_s$ so as to draw the substantially elliptical trajectories $T_{56a}$, $T_{56b}$.

Moreover, when the cutting edge portions 56a, 56b of the cutting tools 44a, 44b are located in the operation areas $A_2$ from the entrance positions $L_1$ to the exit positions $L_2$, the not-illustrated rotating table stops the rotation of the workpiece W and, when the cutting edge portions 56a, 56b of the cutting tools 44a, 44b are located in the operation areas $A_1$ from the exit positions $L_2$ to the entrance positions $L_1$, the not-illustrated rotating table rotates the workpiece W by a predetermined angle (angle corresponding to one pitch).

The workpiece W can be thus subjected to the gear chamfering by intermittently rotating the workpiece W located at the gear chamfering position $P_4$ and mounted on the not-illustrated rotating table about the $C_3$ axis and by driving the motor 46 in the gear chamfering processing device 40 and causing the cutting edge portion's 56a, 56b of the cutting tools 44a, 44b to operate so as to draw the substantially elliptical trajectories $T_{56a}$, $T_{56b}$.

In the embodiment, causing the cutting edge portions 56a, 56b of the cutting tools 44a, 44b to operate so as to draw the substantially elliptical trajectories $T_{56a}$, $T_{56b}$ allows the not-illustrated rotating table to sufficiently rotate the workpiece W by the predetermined angle (angle corresponding to one pitch) while the cutting edge portions 56a, 56b are located in the operation areas $A_1$ from the exit positions to the entrance positions $L_3$. Accordingly, among the operations areas, no large operation area needs to be set for the rotation of the workpiece W by the predetermined angle. Hence, it is possible to prevent an increase of non-processing time and improve processing efficiency as a chamfering device.

Moreover, in the embodiment, since the cutting tools 44a, 44b have the cutting edge shapes similar to those in the conventional techniques, the workpiece w is intermittently rotated about the $C_3$ axis. Employing special shapes as the cutting edge shapes of the cutting tools 44a, 44b allows the workpiece W to be rotated about the $C_3$ axis also in the operation areas $A_2$ in which the cutting edge portions 56a, 56b of the cutting tools 44a, 44b move from the entrance positions $L_1$ to the exit positions $L_2$. When gear chamfering cutting tools with such special shapes are used, the gear chamfering can bio performed while continuously rotating the workpiece (gear to be cut) W.

EXPLANATION OF REFERENCE NUMERALS 1 hobbing machine
10 bed
20 column (moving means)
21 saddle (moving means)
22 hob head (moving means)
23 hob support (moving means)
24 hob cutter (gear processing tool)
30 counter column
31 conveying device
32 main body part
33 gripper
40 gear chamfering processing device (gear chamfering device)
41 main body part (structure part)
42a, 42b swinging parts (tool holding part)
43a, 43b restricting parts (substantially linear movement means, rotating member)
44a, 44b cutting tools (gear chamfering tool)
45a, 45b cutting tool holding part (tool holding part)
46 drive motor (circular movement means, driving part)
47 first drive gear (circular movement mean), gear part)
48a, 48b second drive gear (circular movement means, gear part)
49a, 49b eccentric shaft (circular movement means)
50a, 50b first shaft portion (circular movement means)
51a, 51b second shaft portion (circular movement means)
52a, 52b bearing
53a, 53b bearing
54a, 54b first pin member (substantially linear movement means)
55a, 55b second pin member (substantially linear movement means)
56a, 56b cutting edge portion (tip end part)

The invention claimed is:
1. A gear chamfering device comprising:
a gear chamfering tool which chamfers a tooth profile ridge section of a gear to be cut by cutting;
a tool holding part which holds the gear chamfering tool in one end portion thereof;
a main body part which includes the tool holding part;
substantially linear movement means which includes a restricting part in which one end portion thereof is rotatably supported on the main body part and other end portion thereof is rotatably coupled to other end portion of the tool holding part, the other end portion of the tool holding part being opposite to the one end portion which holds the gear chamfering tool, thereby causing the other end portion of the tool holding part to make a reciprocating movement drawing substantially linear trajectory about the one end portion of the restricting part; and circular movement means for causing an intermediate portion of the tool holding part to make a circular movement, the intermediate portion provided between the one end portion which holds the gear chamfering tool and the other end portion which is caused to make the reciprocating movement by the substantially linear movement means, wherein a tip end part of the gear chamfering tool is caused to make a substantially elliptical movement so as to pass an entrance position where at least part of the gear chamfering tool enters a portion between tooth surfaces of the gear to be cut and an exit position where the gear chamfering tool exits from the portion between the tooth surfaces of the gear to be cut, by combining the substantially linear movement means and the circular movement means, and the gear to be cut is rotated while the tip end part of the chamfering tool is located between the exit position and the entrance position.

2. The gear chamfering device according to claim 1, wherein a pair of the gear chamfering tools, a pair of the tool holding parts, a pair of the circular movements means, and a pair of the substantially linear movement means are provided to face the gear to be cut.

3. The gear chamfering device according to claim 1, wherein the circular movement means includes a drive part, a gear part which is coupled to the drive part, a first shaft portion which is coupled to the gear part and which is rotated by drive of the drive part, and a second shaft portion which is continuous to the first shaft portion and which is caused to make a circular movement by rotation of the first shaft portion, and the tool holding part is coupled at the intermediate portion to the second shaft portion.

4. The gear chamfering device according to claim 1, wherein in the tool holding part, a holding position of the gear chamfering tool is adjustable in a pitch direction of the gear to be cut.

5. A gear processing machine comprising:

a gear processing tool for performing predetermined gear processing on a gear to be cut;

moving means for moving the gear processing tool in three different axial directions;

a conveying device which conveys the gear to be cut between a loading-unloading position where the gear to be cut is loaded or unloaded and a gear processing position where the gear processing tool performs the gear processing on the gear to be cut; and the gear chamfering device according to claim 1, wherein the conveying device conveys the gear to be cut to a gear chamfering position where the gear chamfering device performs the gear chamfering on the gear to be cut between the loading-unloading position and the gear processing position.

6. The gear chamfering device according to claim 2, wherein the circular movement means includes a drive part, a gear part which is coupled to the drive part, a first shaft portion which is coupled to the gear part and which is rotated by drive of the drive part, and a second shaft portion which is continuous to the first shaft portion and which is caused to make a circular movement by rotation of the first shaft portion, and the tool holding part is coupled at the intermediate portion to the second shaft portion.

7. The gear chamfering device according to claim 2, wherein in the tool holding part, a holding position of the gear chamfering tool is adjustable in a pitch direction of the gear to be cut.

8. The gear chamfering device according to claim 3, wherein in the tool holding part, a holding position of the gear chamfering tool is adjustable in a pitch direction of the gear to be cut.

9. A gear processing machine comprising:

a gear processing tool for performing predetermined gear processing on a gear to be cut;

moving means for moving the gear processing tool in three different axial directions;

a conveying device which conveys the gear to be cut between a loading-unloading position where the gear to be cut is loaded or unloaded and a gear processing position where the gear processing tool performs the gear processing on the gear to be cut; and the gear chamfering device according to claim 2, wherein the conveying device conveys the gear to be cut to a gear chamfering position where the gear chamfering device performs the gear chamfering on the gear to be cut between the loading-unloading position and the gear processing position.

10. A gear processing machine comprising:

a gear processing tool for performing predetermined gear processing on a gear to be cut;

moving means for moving the gear processing tool in three different axial directions;

a conveying device which conveys the gear to be cut between a loading-unloading position where the gear to be cut is loaded or unloaded and a gear processing position where the gear processing tool performs the gear processing on the gear to be cut; and the gear chamfering device according to claim 3, wherein the conveying device conveys the gear to be cut to a gear chamfering position where the gear chamfering device performs the gear chamfering on the gear to be cut between the loading-unloading position and the gear processing position.

11. A gear processing machine comprising:

a gear processing tool for performing predetermined gear processing on a gear to be cut;

moving means for moving the gear processing tool in three different axial directions;

a conveying device which conveys the gear to be cut between a loading-unloading position where the gear to be cut is loaded or unloaded and a gear processing position where the gear processing tool performs the gear processing on the gear to be cut; and the gear chamfering device according to claim 4, wherein the conveying device conveys the gear to be cut to a gear chamfering position where the gear chamfering device performs the gear chamfering on the gear to be cut between the loading-unloading position and the gear processing position.

* * * * *